3 Sheets--Sheet 2.

R. S. CATHCART.
Shaft-Hangers.

No. 148,412. Patented March 10, 1874.

WITNESSES-
Jas. E. Hutchinson
John R. Young

INVENTOR.
R. S. Cathcart, by
Prindle and Dean, his
Attorneys.

3 Sheets--Sheet 3.
R. S. CATHCART.
Shaft-Hangers.
No. 148,412. Patented March 10, 1874.
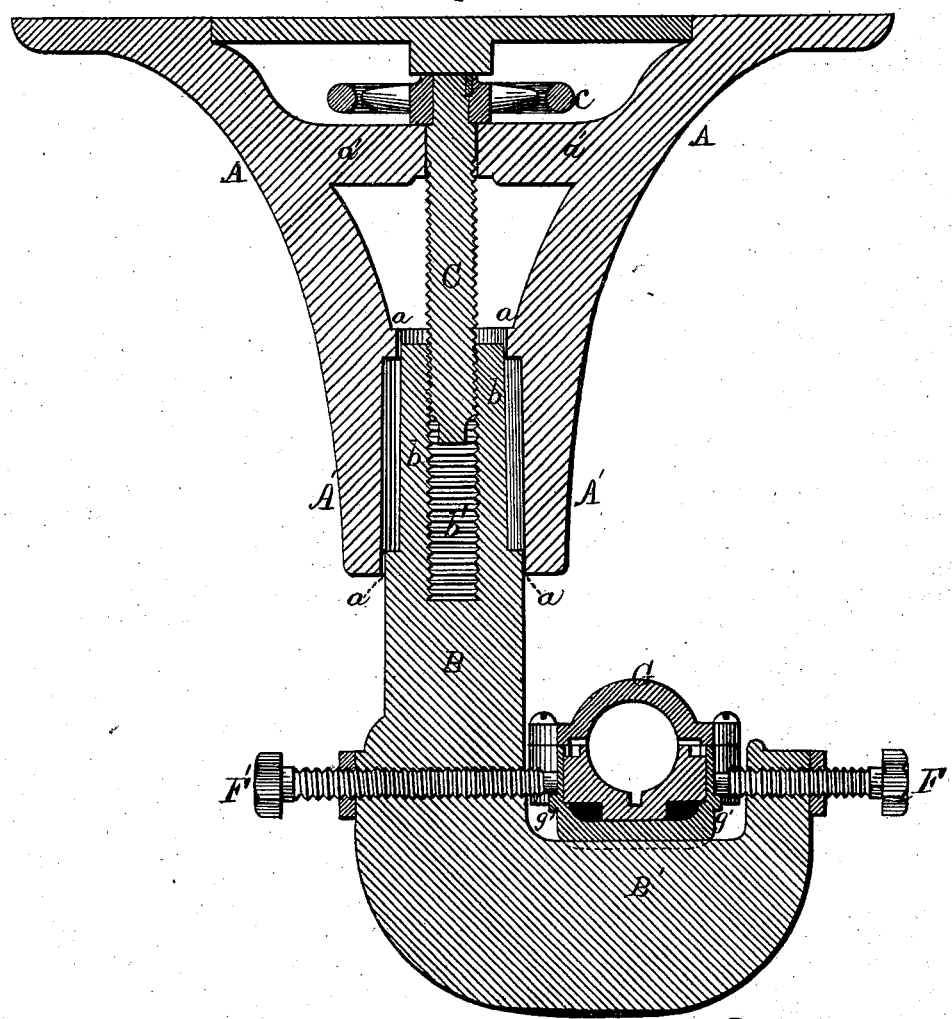
WITNESSES-
Jas. E. Hutchinson
John R. Young
INVENTOR.
R. S. Cathcart, by
Prindle and Dean, his Attys.

UNITED STATES PATENT OFFICE.

RODNEY S. CATHCART, OF CINCINNATI, OHIO, ASSIGNOR TO HIMSELF AND THE STRAUB MILL COMPANY, OF SAME PLACE.

IMPROVEMENT IN SHAFT-HANGERS.

Specification forming part of Letters Patent No. 148,412, dated March 10, 1874; application filed January 6, 1874.

*To all whom it may concern:*

Be it known that I, RODNEY S. CATHCART, of Cincinnati, in the county of Hamilton and in the State of Ohio, have invented certain new and useful Improvements in Hangers for Shafts; and do hereby declare that the following is a full, clear, and exact description thereof, reference being had to the accompanying drawings making a part of this specification, in which—

Figure 1:
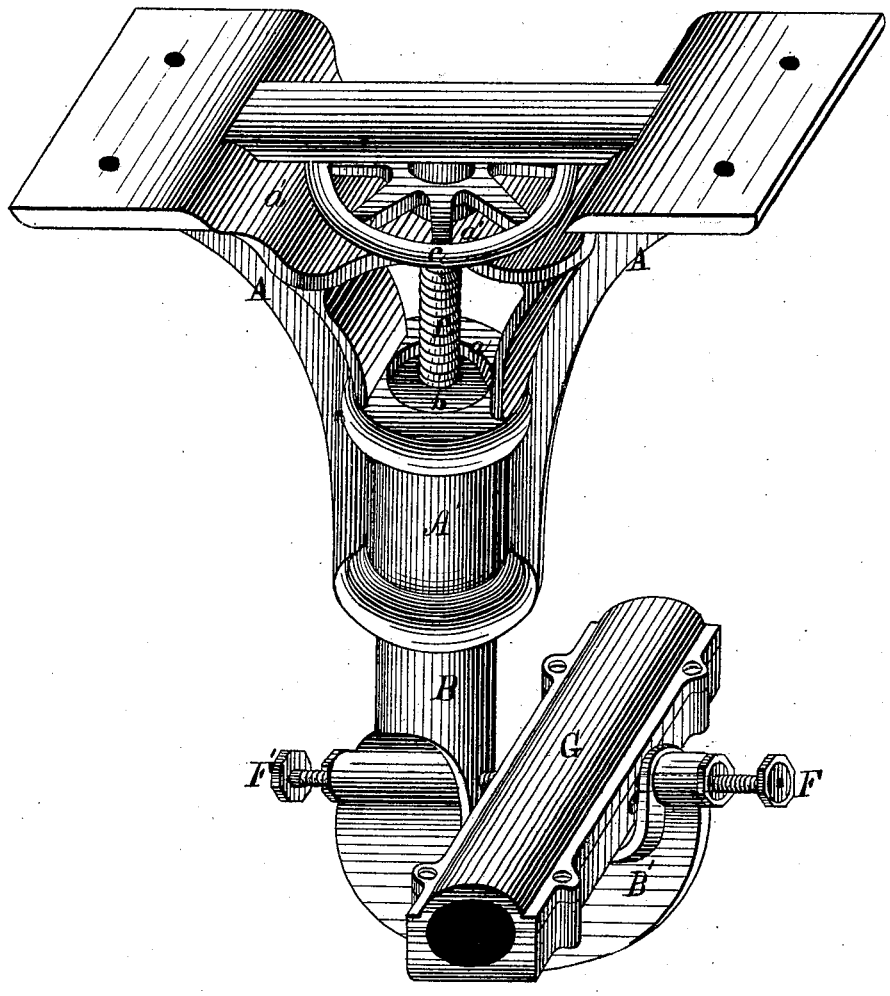
Figure 2:
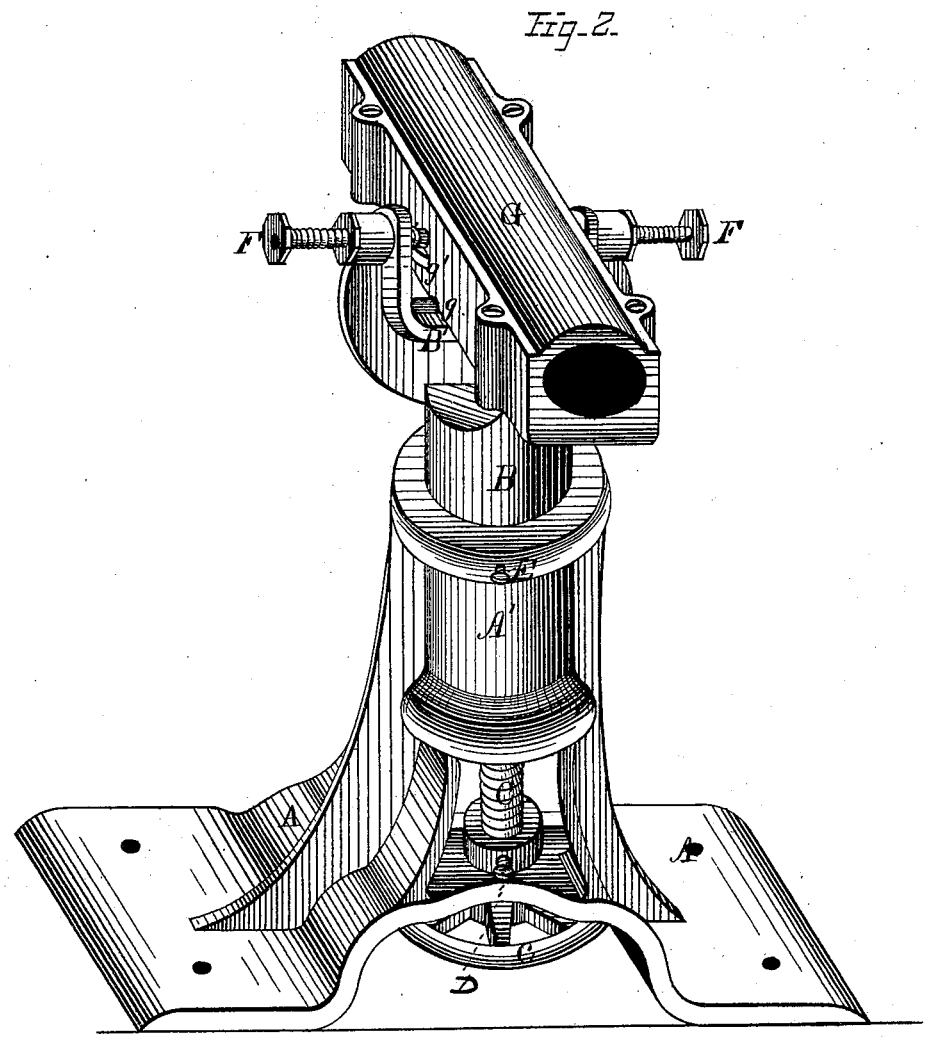

Figure 1 is a perspective view of my improved hanger as applied to a ceiling. Fig. 2 is a like view of the same as arranged for use upon a floor, and Fig. 3 is a vertical central section of Fig. 1 upon a line extending transversely through the box.

Letters of like name and kind refer to like parts in each of the figures.

The design of my invention is to increase the strength, durability, and ease of adjustment of a shaft-hanger and journal-box without material increase in their weight or cost; and, to this end, it consists in a journal-box having an external groove on one of its faces or sides, at right angles with its length, and resting thereby upon a horizontal bearing of the hanger, and secured in position, and capable of lateral adjustment, substantially as and for the purpose hereinafter described.

In the annexed drawings, A represents the frame or fixed portion of the hanger, which is suitably shaped, so as to cause it to have a firm bearing upon the ceiling or floor to which it may be attached. At its opposite end the frame A is provided with a cylindrical enlargement, A′, within which is formed a cylindrical opening, $a$, that, as seen in Fig. 3, has a uniform size from its lower end to a point near its upper end, and from thence upward is considerably reduced in diameter. Within the opening $a$ is fitted a spindle, B, which, at its upper end, is provided with a reduced portion, $b$, that conforms to the smaller portion of said opening, and enables said spindle to be moved longitudinally within the same. A threaded opening, $b'$, extending downward through the center of the spindle B, receives a correspondingly-threaded screw, C, that from thence extends upward through, and is swiveled within, a cross-brace, $a'$, of the frame A, and is provided, upon its upper end, with a hand-wheel, $c$. By turning said screw within its bearings said spindle will be raised or lowered, so as to enable the desired adjustment of its lower end to be effected. A set-screw, D, passing inward through the brace $a'$, bears against the journal of said screw, and prevents the same from being turned when adjusted to position, while a second set-screw, E, passing through the wall of the enlargement A′, bears against the spindle B, and locks the same in circumferential position. The lower end of the spindle B extends laterally and horizontally outward to a sufficient distance to contain a journal-box, and thence extends upward sufficiently to enable a screw, F, to be contained within a threaded opening that passes horizontally and radially inward through the same. A second set-screw, F′, passes through a second threaded opening that is provided in and through said spindle in a line with said screw F. The upper edge of the horizontal portion of the arm B′ of the spindle B is made narrow and round, and upon the same is placed a journal-box, G, which is provided upon its lower side, and at its longitudinal center, with a transverse groove, $g$, that corresponds to, and embraces, the said rounded edge of said arm.

As thus arranged, the weight of the journal-box is supported upon, or by, the horizontal arm of the spindle, upon which it may be moved laterally by means of the screws F and F′, while, longitudinally, said box is left free to rock upon its bearing.

In order that the box G may be prevented from vertical displacement, a lug, $g'$, is provided upon each side immediately below the inner end of the screw F or F′, which lug, at its upper side, is formed upon a circular line that is concentric to the axis upon which said box rocks.

The hanger and box, thus constructed and combined, are capable of every adjustment required; while, from the nature of the bearing of said box upon said hanger, far greater strength and durability are secured than would be possible were the former supported directly upon, and adjusted vertically by means of, a screw.

For use upon floors, the lateral arm of the spindle is dispensed with, and a similar bearing for the box formed directly upon the end of said spindle.

While possessing the advantages named, the hanger and box are easy of construction, and not more expensive than those of ordinary construction.

The especial construction of the interior of the box is not claimed; the same being the subject of another application for patent.

Having thus fully set forth the nature and merits of my invention, what I claim as new, is—

The horizontal bearing B', provided with set-screws F and F', and combined with the journal-box G, having the external groove $g$, and side lugs $g'$, substantially as and for the purposes set forth.

In testimony that I claim the foregoing I have hereunto set my hand this 29th day of December, 1873.

RODNEY S. CATHCART.

Witnesses:
GEO. S. PRINDLE,
WILLIAM FITCH.